United States Patent
Gallaway et al.

(10) Patent No.: US 9,367,877 B1
(45) Date of Patent: Jun. 14, 2016

(54) SYSTEM FOR ELECTRONIC ADMINISTRATION OF EMPLOYEE SKILL CERTIFICATION BADGE PROGRAM

(71) Applicant: Hartford Fire Insurance Company, Hartford, CT (US)

(72) Inventors: Jason K. Gallaway, West Hartford, CT (US); Willis Duane Schmidt, Jr., Southington, CT (US); Jodi Greenspan Kirsch, Branford, CT (US); Richard A. Bowman, Ellington, CT (US); Senthil Theagarajan Nathan, Glastonbury, CT (US); Mark Richard Wagner, West Hartford, CT (US); Bradley Adam Lynch, Plymouth, MN (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 14/676,121

(22) Filed: Apr. 1, 2015

(51) Int. Cl.
| | |
|---|---|
| *G06F 7/00* | (2006.01) |
| *G06Q 40/08* | (2012.01) |
| *G06Q 10/06* | (2012.01) |
| *G06Q 10/10* | (2012.01) |

(52) U.S. Cl.
CPC .......... *G06Q 40/08* (2013.01); *G06Q 10/06398* (2013.01); *G06Q 10/105* (2013.01)

(58) Field of Classification Search
USPC .................... 235/376, 385; 705/7.13, 7.14
See application file for complete search history.

(56) References Cited

U.S. PATENT DOCUMENTS

| | | | |
|---|---|---|---|
| 8,768,751 B2 | 7/2014 | Jakowski et al. | |
| 2013/0311245 A1 | 11/2013 | Blackburn et al. | |
| 2014/0039956 A1* | 2/2014 | Cicio, Jr. ........ | G06Q 10/063112 705/7.14 |
| 2014/0051506 A1 | 2/2014 | Ameling et al. | |
| 2014/0274413 A1 | 9/2014 | Chelst | |
| 2014/0278638 A1 | 9/2014 | Kreukamp et al. | |
| 2014/0279629 A1* | 9/2014 | McConnell ........ | G06Q 10/0639 705/320 |
| 2014/0304182 A1* | 10/2014 | Kurien ............. | G06Q 10/1053 705/321 |
| 2014/0329210 A1 | 11/2014 | Masood et al. | |
| 2014/0353369 A1* | 12/2014 | Malin .............. | G06K 19/06037 235/375 |

OTHER PUBLICATIONS

Scheibelhut, Brent, "3 Ways to Recognize and Motivate Employees Using Salesforce", Oct. 28, 2013, Retrieved from: http://blogs.salesforce.com/company/2013/10/motivate-employees.html, retrieved Mar. 19, 2015, 7pgs.

(Continued)

*Primary Examiner* — Ahshik Kim
(74) *Attorney, Agent, or Firm* — Buckley, Maschoff & Talwalkar LLC

(57) ABSTRACT

A communication device may receive an employee skill certification badge request for: (i) a first employee of an insurance enterprise, and (ii) a first employee skill category of a plurality of potential categories. Information about the received may be stored, and a badge server may gather and store data (e.g., quantitative and/or qualitative data) in an electronic evidence file based the first employee's interactions with customers during normal performance of his or her employment. A first manager of the first employee may be determined, and the badge server may receive from the first manager an indication that the electronic evidence file meets a threshold criteria. Responsive to the received indication, the badge server may associate the first employee with the first employee skill certification badge and transmit data to cause display of an icon associated with the first employee skill certification badge on other remote devices.

23 Claims, 13 Drawing Sheets

(56) References Cited

OTHER PUBLICATIONS

Silverman, Rachel Emma, "Lateast Game Theory: Mixing Work and Play", Oct. 10, 2011, The Wall Street Journal, Retrived from: http://online.wsj.com/articles/SB10001424052970204294504576615371783795248, retrieved Mar. 19, 2015, 4pgs.

* cited by examiner

| EMPLOYEE IDENTIFIER 702 | MANAGER IDENTIFIER 704 | BADGE IDENTIFIER 706 | EVIDENCE FILE 708 | STATUS 710 |
|---|---|---|---|---|
| EE_10001 | M_10001 | B_01 | EF_EE_10001_B_01 | AWARDED 1/15/2016 |
| EE_10002 | M_10001 | B_03 | EF_EE_10002_B_03 | LEVEL 2 |
| EE_10003 | M_10002 | B_01 | EF_EE_10003_B_01 | PENDING |
| EE_10003 | M_1002 | B_02 | EF_EE_10001_B_02 | AWARDING 3/20/2017 EXPIRES 3/20/2018 |

FIG. 7

SYSTEM FOR ELECTRONIC ADMINISTRATION OF EMPLOYEE SKILL CERTIFICATION BADGE PROGRAM

FIELD

The present invention relates to computer systems and, more particularly, to computer systems that administer an employee skill certification badge program.

BACKGROUND

An enterprise will often encourage employees to improve. For example, an employer may want employees to develop specific abilities to improve interactions with customers. One way of rewarding an employee who makes such improvements is to publicly acknowledge his or her accomplishment (e.g., via an announcement in a company newsletter, during an employee award luncheon, giving the employee a certificate or statute he or she can display on his or her desk, etc.). Determining which employees should receive this type of acknowledgement can be a difficult task, however, especially when there are a substantial number of employees and/or a number of different types of improvements that are being encouraged. For example, the decision to provide such a reward will typically be based on information from a number of disparate systems that may not be able to communicate with each other. Such systems may include, for example, human resource databases, training program systems and modules, paper files, real world interactions with actual customers, etc. As a result, it can be difficult to properly gather and review the appropriate information to make an informed decision. It would therefore be desirable to provide systems and methods to facilitate administration of an employee skill certification program in an automated, efficient, and accurate manner.

SUMMARY

According to some embodiments, systems, methods, apparatus, computer program code and means may facilitate administration of an employee skill certification badge program. In some embodiments, a communication device may receive, from a remote device, an employee skill certification badge request for: (i) a first employee of an insurance enterprise, and (ii) a first employee skill category of a plurality of potential categories. Information about the received employee skill certification badge request may be stored, and a badge server may gather and store data in an electronic evidence file based the first employee's interactions with customers during normal performance of his or her employment. A first manager of the first employee may be determined, and the badge server may receive from the first manager an indication that the electronic evidence file meets a threshold criteria. Responsive to the received indication, the badge server may associate the first employee with the first employee skill certification badge and transmit data to cause display of an icon associated with the first employee skill certification badge on other remote devices.

Some embodiments provide: means for receiving, from a remote device via a communication device, an employee skill certification badge request associated with: (i) a first employee, and (ii) a first employee skill category of a plurality of potential employee skill categories; means for storing, by a computer processor of a badge server, information associated with the received employee skill certification badge request; means for gathering and storing, by the computer processor of the badge server, data in an electronic evidence file associated with the first employee's interactions with customers during normal performance of his or her employment; means for automatically determining, by the computer processor of the badge server, a first manager associated with the first employee; means for receiving from the first manager an indication that the electronic evidence file meets a threshold criteria of the first employee skill category; responsive to the received indication, means for associating, by the computer processor of the badge server, the first employee with the first employee skill certification badge; and means for arranging, by the computer processor of the badge server, for an icon associated with the first employee skill certification badge to be displayed via other remote devices.

A technical effect of some embodiments of the invention is an improved and computerized method to facilitate administration of an employee skill certification badge program. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 7 is a tabular portion of a badge database according to some embodiments.

DETAILED DESCRIPTION

Figure 1:
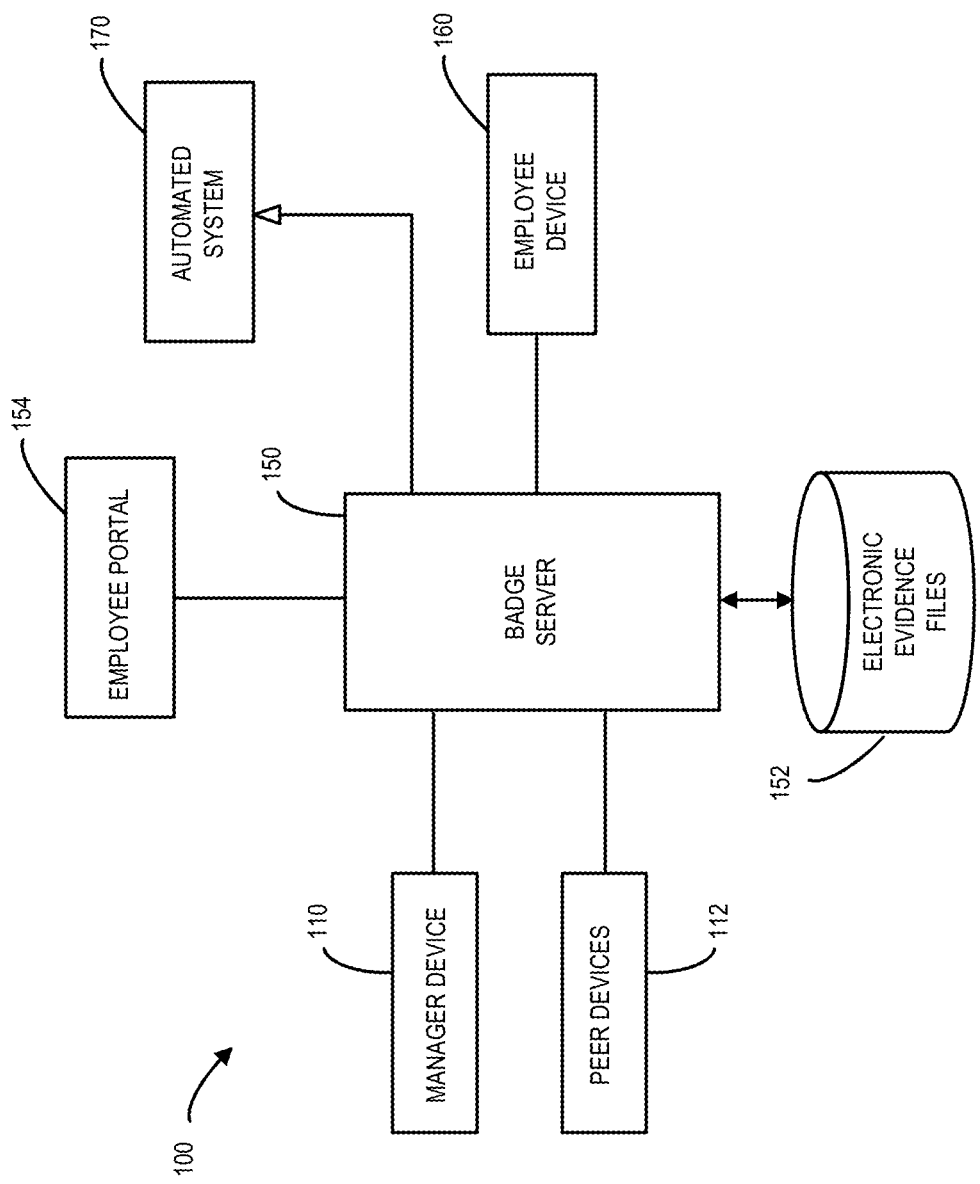
FIG. 1 is block diagram of a system according to some embodiments of the present invention.

An enterprise, such as an insurance company, will often encourage employees to improve. For example, the insurance company may want insurance claim handlers to develop specific abilities to improve interactions with customers. One way of rewarding a claim handler who makes such improvements is to publicly acknowledge his or her accomplishment. Determining which claim handlers should receive this type of acknowledgement can be a difficult task, however. For example, the decision to provide such a reward will typically be based on information from a number of disparate systems such as human resource databases, training program systems and modules, paper files, real world interactions with actual customers, etc. As a result, it can be difficult to properly gather and review the appropriate information to make an informed decision. It would therefore be desirable to provide systems and methods to facilitate administration of an employee skill certification badge program in an automated, efficient, and accurate manner. FIG. 1 is block diagram of a system 100 according to some embodiments of the present invention. In particular, the system 100 includes an employee skill certification badge server 150 that may exchange information with a manager device 110, peer devices 112, and/or an employee device 160.

The badge server 150 may, according to some embodiments, receive an employee skill certification badge request. For example, an underwriter or claim handler might submit the request to the badge server 150. Note that such a request might also be received from an employee's manager (e.g., via the manager device 110). According to some embodiments, information about received requests may be stored at an electronic evidence files database 152. Responsive to the request, the badge server 150 might forward information to the manager device 110 and/or peer devices 112.

The badge server 150, manager device 110, peer devices 112, and/or employee device 160 might be, for example, associated with a Personal Computer (PC), laptop computer, an enterprise server, a server farm, and/or a database or similar storage devices. The badge server 150 may, according to some embodiments, be associated with an insurance provider.

According to some embodiments, an "automated" badge server 150 may facilitate administration of an employee skill certification badge program. As used herein, the term "automated" may refer to, for example, actions that can be performed with little (or no) intervention by a human.

As used herein, devices, including those associated with the badge server 150 and any other device described herein may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The badge server 150 may store information into and/or retrieve information from the electronic evidence files database 152. The electronic evidence files database 152 might be associated with, for example, an insurance company or human resources department and might also store data associated with past and current badge requests. The electronic evidence files database 152 may be locally stored or reside remote from the badge server 150. As will be described further below, the electronic evidence files database 152 may be used by the badge server 150 to review badge requests and/or award badges to employees. According to some embodiments, the badge server 150 communicates information about badges to an automated system 170, such as by transmitting an electronic file to a human resources device, a web portal platform, an email server, a social media platform, a workflow management system, etc.

Although a single badge server 150 is shown in FIG. 1, any number of such devices may be included. Moreover, various devices described herein might be combined according to embodiments of the present invention. For example, in some embodiments, the badge server 150 and electronic evidence files database 152 might be co-located and/or may comprise a single apparatus.

Figure 2:
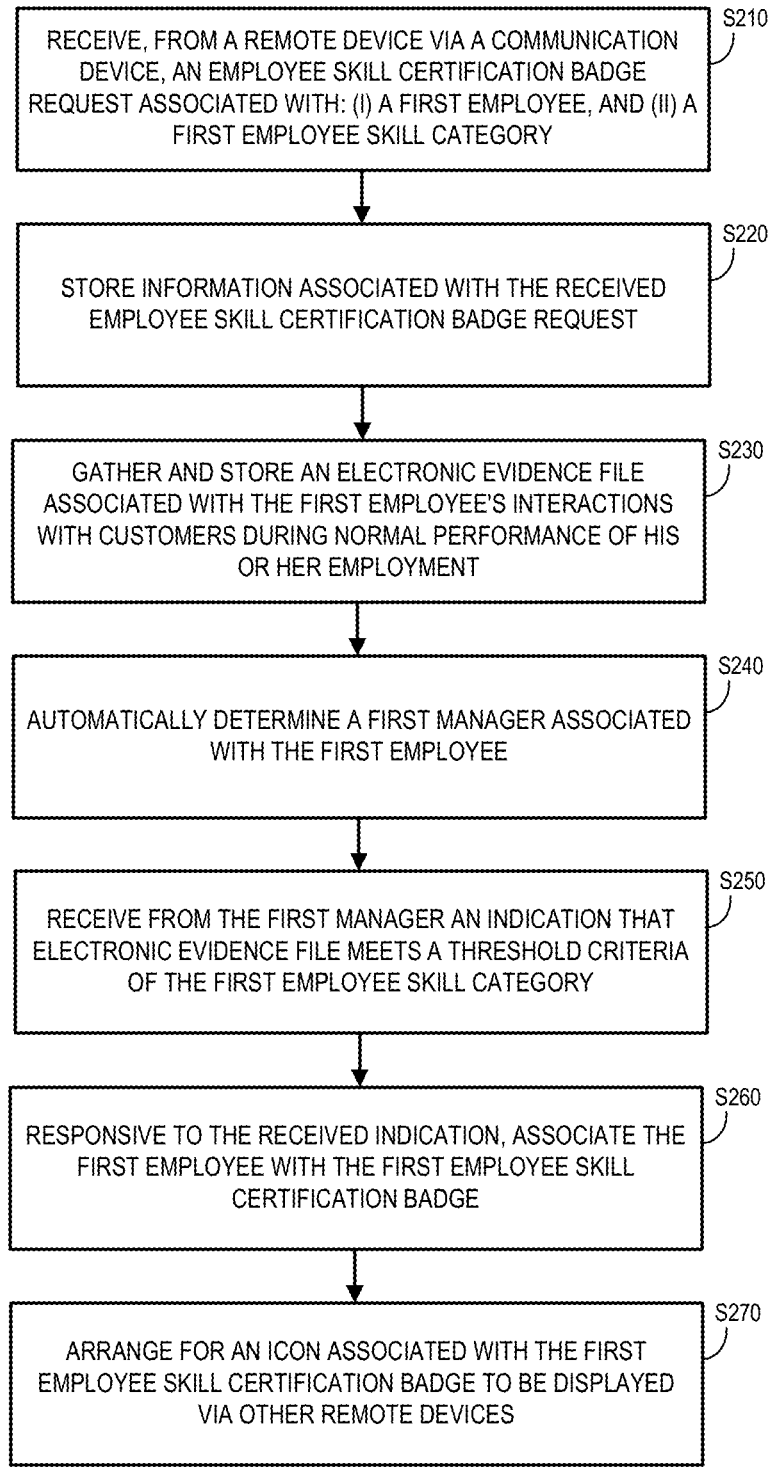
FIG. 2 illustrates a method that might be performed in accordance with some embodiments.

FIG. 2 illustrates a method that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an employee skill certification badge request may be received from a remote device via a communication network. The badge request might be associated with, for example: (i) a first employee of an insurance enterprise, and (ii) a first employee skill category of a plurality of potential employee skill categories. For example, a manager might enter a web-based badge portal or store and indicate that a particular employee is interested in receiving a "coaching" type badge. In other cases, an employee might submit the badge request. At S220, information associated with the received employee skill certification badge request is stored (e.g., in a badge request database). At S230, data for an electronic evidence file, associated with the first employee's interactions with customers during normal performance of his or her employment, may be automatically gathered and stored. The electronic evidence file might include, for example customer surveys, a volume of work being processed by the employee over a period of time, text files, images, audio information, qualitative and/or quantitative performance data, etc. As used herein, the employee's interactions with "customers" may include both customers of the insurance enterprise and/or other employees of the insurance enterprise. That the electronic evidence file might be, for example, manually created and updated by a manager. According to other embodiments, some or all of the information in the electronic evidence file may be automatically collected. Moreover, note that the electronic evidence file might be stored locally at a manager device, at a central depository, or at any other location.

At S240, a first manager associated with the first employee may be automatically determined. For example, a human resources database may be searched to determine which managers are responsible for which employees. In other cases, the badge request itself might be examined to determine the appropriate manager (e.g., based on who submitted the badge request). At S250, an indication that one or more electronic evidence files meet a threshold criteria of the first employee skill category may be received from the first manager. This indication may, according to some embodiments, be automatically generated using business rules, application logic, and/or predictive models. According to some embodiments, the process may also determine that a peer calibration process approves the employee skill certification badge request. For example, other managers and/or employees might be consulted so that approvals are provided consistently throughout an enterprise.

Figure 3:
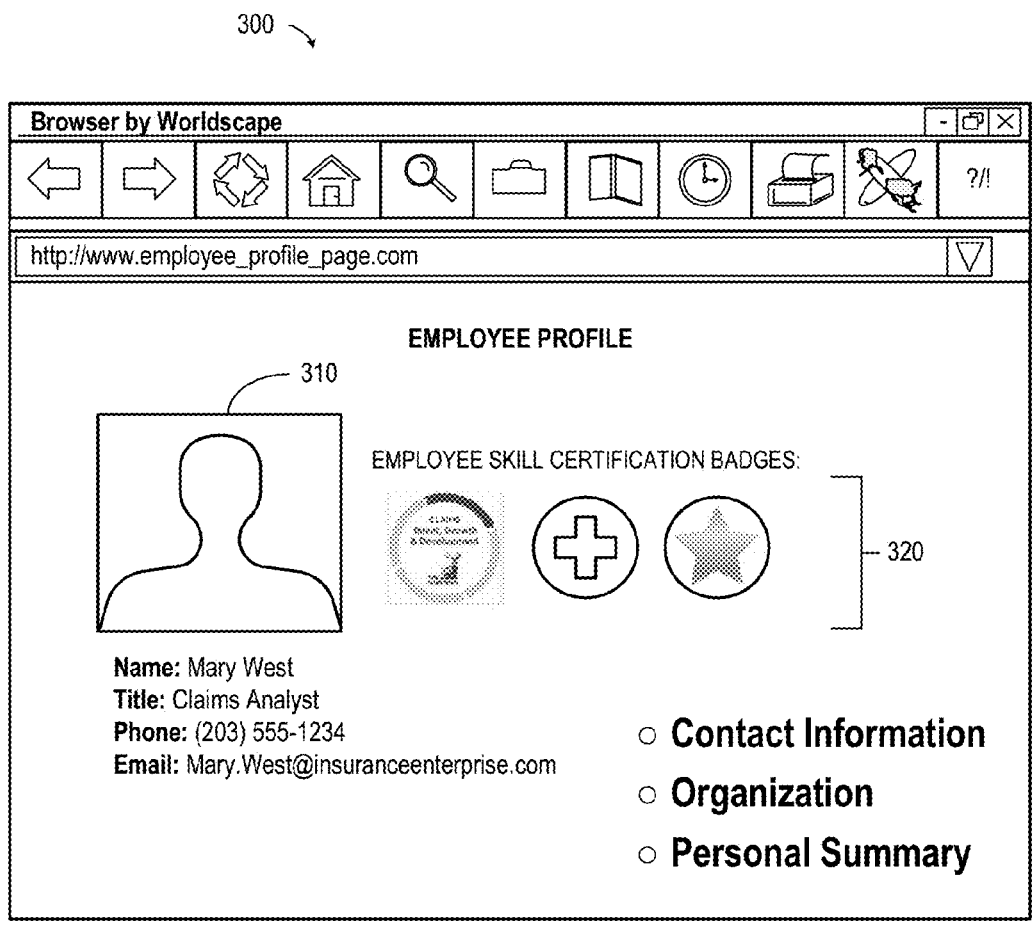
FIG. 3 illustrates an employee profile web page in accordance with some embodiments.

At S260, the first employee is "associated with" the first employee skill certification badge in response to the received indication (that is, he or she receives or is awarded the badge). As a result, data may be transmitted at S270 to cause display of an icon associated with the first employee skill certification badge on other remote devices. For example, the icon may be displayed on an employee profile web page of the first employee. FIG. 3 illustrates an employee profile web display 300 in accordance with some embodiments. The display 300 includes information about the employee, such as his or her picture 310, contact information, etc. The display further includes a badge icon area 320 wherein the approved badge icon will be displayed. Note that a plurality of icons may be displayed in the badge icon area 320 on the employee profile web page display 300, each icon being associated with a different employee skill category (e.g., three badge icons are illustrated in the example of FIG. 3). When the first employee is associated with insurance claims processing, the potential employee skill categories and associated badge icons might be include, for example: (i) data and analytics, (ii) growth and development, (iii) coaching, (iv) communication, (v) customer focus, and/or (vi) innovation and problem solving.

According to some embodiments, badge information might be used to automatically facilitate a creation of a team of employees. For example, a team might be assembled such that two members have a first type of badge and one member has a second type of badge. Moreover, some embodiments may automatically facilitate a comparison between offices of the insurance enterprise based on least in part on employee skill certification badges. According to some embodiments, information about the employee skill certification badge may be automatically transmitted to, for example: (i) an email server, (ii) a workflow application, (iii) a report generator, (iv) a social media server, and/or (v) a calendar application.

Figure 4:
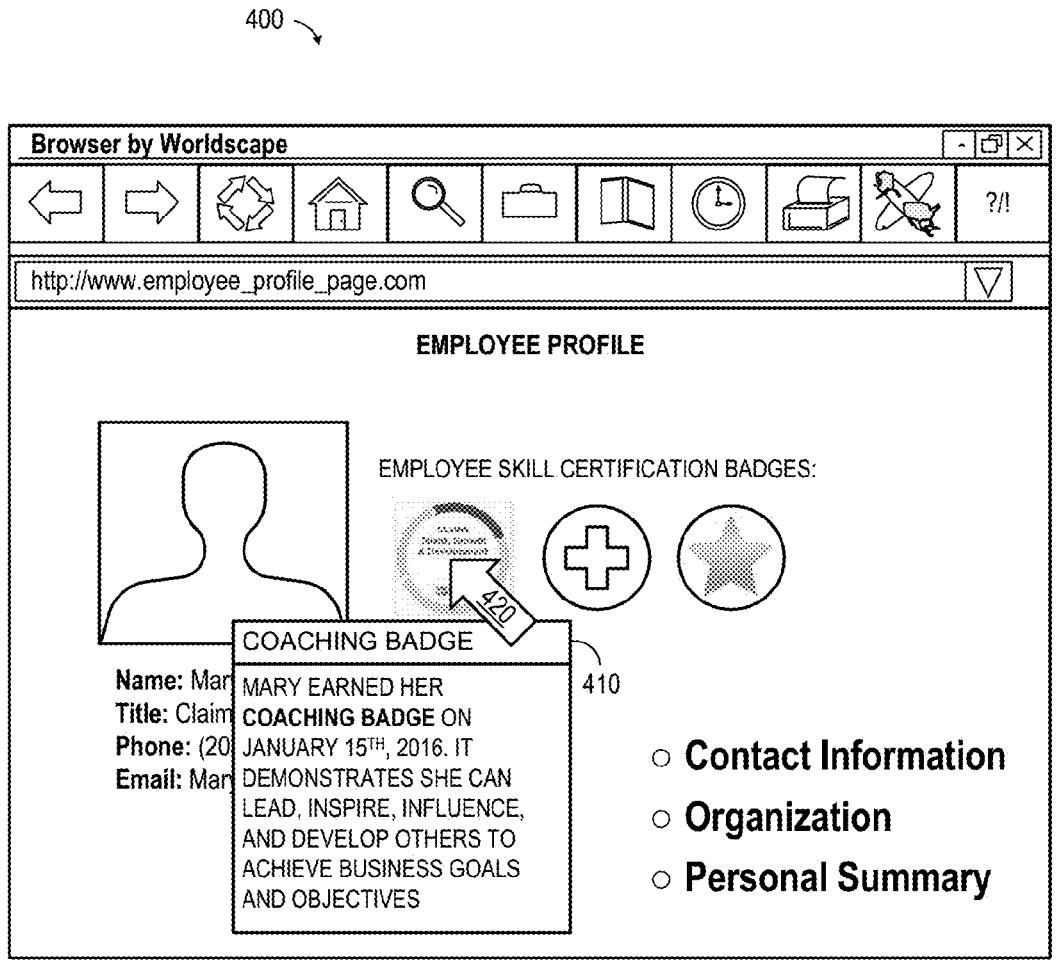
FIG. 4 illustrates another user interface according to some embodiments.

Note that additional information about badges might be provided on an employee profile web page. For example, FIG. 4 illustrates a display 400 wherein a pop up window 410 displays information about an employee skill category. The pop up window 410 might be, for example, activated by a viewer of the web page. According to some embodiments, the pop up window 410 might be activated when a viewer moves a cursor icon 420 over the badge icon. The pop up window 410 might explain the meaning of the badge icon, when the employee earned the badge icon, an expiration date associated with the employee skill certification badge etc.

Figure 5:
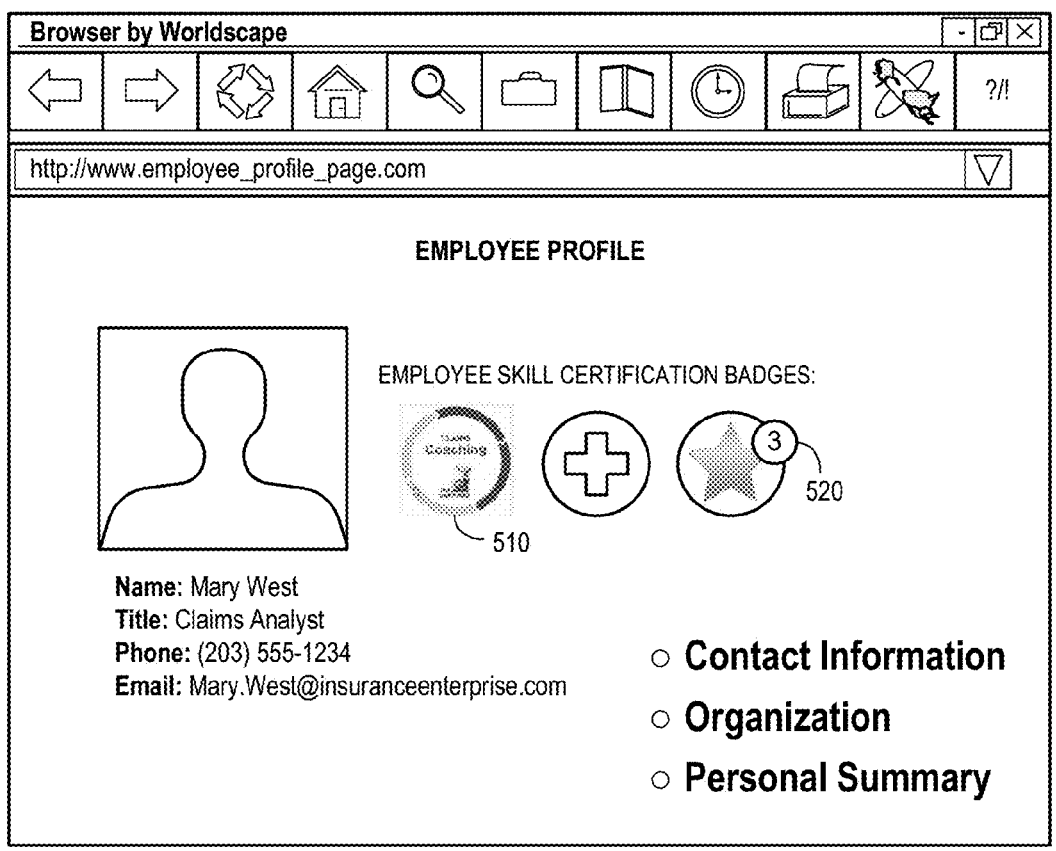
FIG. 5 illustrates still another user interface in accordance with another embodiment.

According to some embodiments, a badge icon might be associated with one of a plurality of potential skill levels for the first employee skill category. For example, FIG. 5 illustrates still another user interface display 500 in accordance with another embodiment. In this example, the coaching badge icon 510 is a level "2" badge as compared to the level "1" coaching badge icon illustrated in FIGS. 3 and 4 (as illustrated by having two portions of the circular perimeter of the badge icon 510 darkened). Levels might be indicated, for example, via numeric value 520, color, etc.

Figure 6:
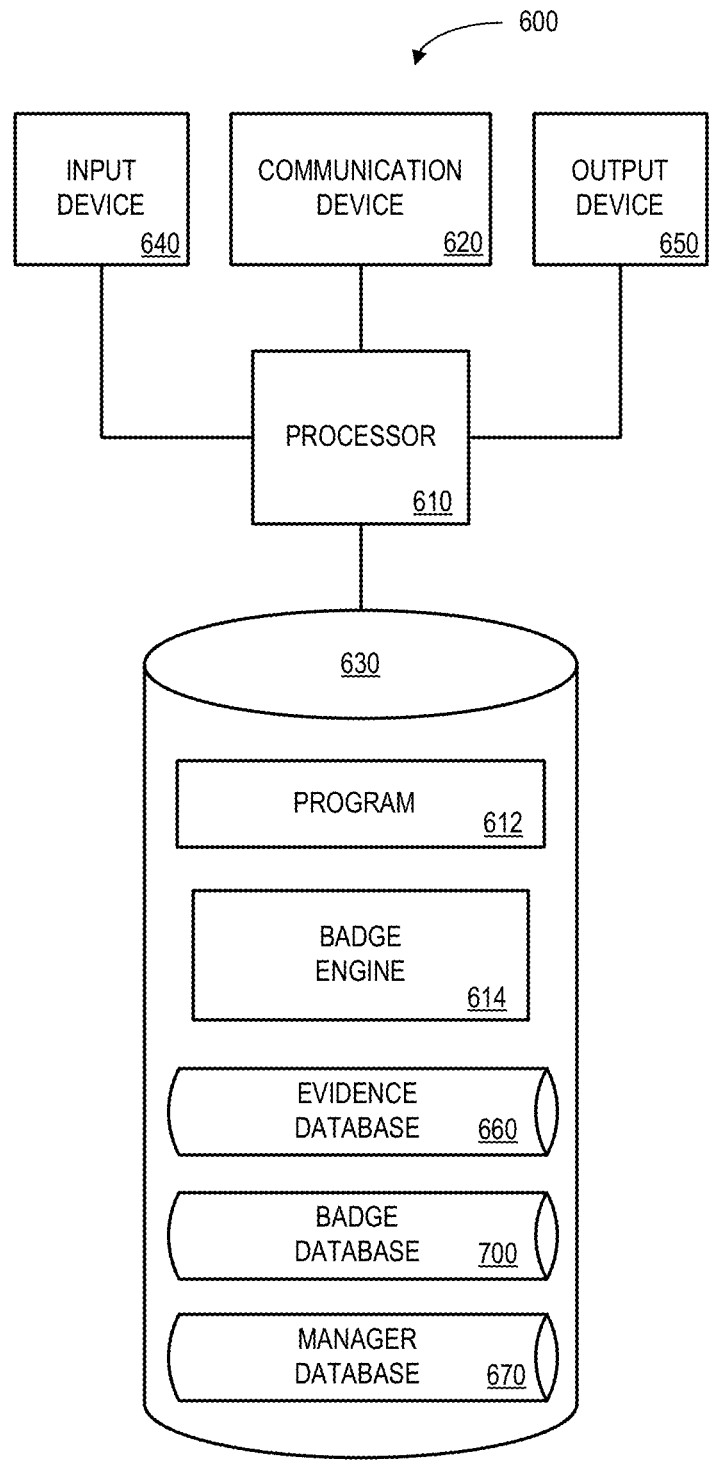
FIG. 6 is block diagram of an employee skill certification badge program tool or platform according to some embodiments of the present invention.

The embodiments described herein may be implemented using any number of different hardware configurations. For example, FIG. 6 illustrates a badge platform 600 that may be, for example, associated with the badge server 150 of the system 100 of FIG. 1. The badge platform 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more remote manager, peer, and/or employee devices. The badge platform 600 further includes an input device 640 (e.g., a mouse and/or keyboard to enter information about badge requirements or supporting evidence) and an output device 650 (e.g., to output reports regarding badge statuses).

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or a badge engine or application 614 for controlling the processor 610. The processor 610 performs instructions of the programs 612, 614, and thereby operates in accordance with any of the embodiments described herein. For example, the processor 610 may receive, from a remote device, an employee skill certification badge request for: (i) a first employee of an insurance enterprise, and (ii) a first employee skill category of a plurality of potential categories. Information about the received employee skill certification badge request may be stored, and the processor 610 may gather and store data in an electronic evidence file based the first employee's interactions with customers during normal performance of his or her employment. A first manager of the first employee may be determined, and the processor 610 may receive from the first manager an indication that the electronic evidence file meets a threshold criteria. Responsive to the received indication, the processor 610 may associate the first employee with the first employee skill certification badge and transmit data to cause display of an icon associated with the first employee skill certification badge on other remote devices.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the badge platform 600 from another device; or (ii) a software application or module within the badge platform 600 from another software application, module, or any other source.

In some embodiments (such as shown in FIG. 6), the storage device 630 further includes an evidence database 660 (e.g., associated with an employee's performance, customer surveys, etc.), a badge database 700 (e.g., indicating badges that have been requested and/or awarded) and a manager database 670 (e.g., a human resource database indicating which employees report to each manager). An example of a database that may be used in connection with the badge platform 600 will now be described in detail with respect to FIG. 7. Note that the database described herein is only one example, and additional and/or different information may be stored therein. Moreover, various databases might be split or combined in accordance with any of the embodiments described herein. For example, the badge database 700 and/or evidence database 660 might be combined and/or linked to each other within the badge engine 614.

Referring to FIG. 7, a table is shown that represents the badge database 700 that may be stored at the badge platform 600 according to some embodiments. The table may include, for example, entries identifying requests for badges. The table may also define fields 702, 704, 706, 708, 710 for each of the entries. The fields 702, 704, 706, 708, 710 may, according to some embodiments, specify: an employee identifier 702, a manager identifier 704, a badge identifier 706, an evidence file 708, and a status 710. The badge database 700 may be created and updated, for example, based on information electronically received from requestor devices, manager devices, peer devices, and/or customers of an insurance enterprise.

The employee identifier 702 may be, for example, a unique alphanumeric code identifying an employee who has requested a badge (or who had a manager request the badge on his or her behalf). The manager identifier 704 may indicate who will be reviewing the request and/or determining if the badge will be awarded to the employee. The badge identifier 706 might indicate, for example, an employee skill category of a plurality of potential employee skill categories (e.g., the badge identifier 706 of "B_01" might be associated with a coaching badge icon). The evidence file 708 might contain, or comprise a pointer to a file that contains, information about the employee's interactions with customers during the normal performance of his or her employment (e.g., customer surveys, job training interactions, a volume of work being handled). The status 710 might indicate, for example, that the badge request is pending, has been awarded, etc. along with an indication of a level and/or expiration date associated with the badge icon.

Figure 8:
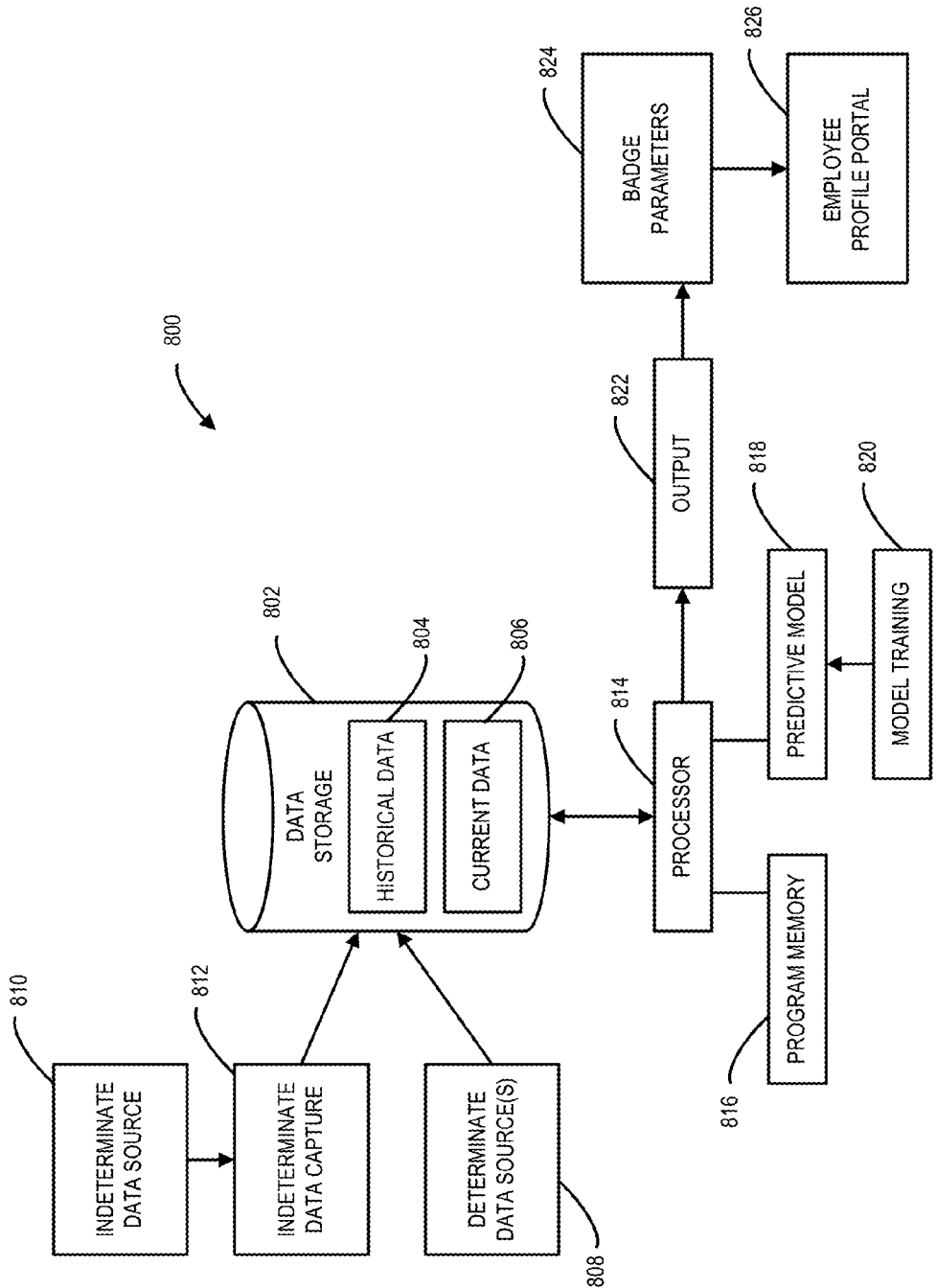
FIG. 8 is a partially functional block diagram that illustrates aspects of a computer system provided in accordance with some embodiments of the invention.

According to some embodiments, one or more predictive models may analyze historic badge data to generate award requirements, recommendations, or decisions, etc. Features of some embodiments associated with a predictive model will now be described by first referring to FIG. 8. FIG. 8 is a partially functional block diagram that illustrates aspects of a computer system 800 provided in accordance with some embodiments of the invention. For present purposes it will be assumed that the computer system 800 is operated by an insurance company (not separately shown) for the purpose of providing badge information to a web portal, workflows, and/or employees as appropriate.

The computer system 800 includes a data storage module 802. In terms of its hardware the data storage module 802 may be conventional, and may be composed, for example, by one or more magnetic hard disk drives. A function performed by the data storage module 802 in the computer system 800 is to receive, store and provide access to both historical transaction data (reference numeral 804) and current transaction data (reference numeral 806). As described in more detail below, the historical transaction data 804 is employed to train a predictive model to provide an output that indicates badge parameters, and the current transaction data 806 is thereafter analyzed by the predictive model. Moreover, as time goes by, and results become known from processing current transactions, at least some of the current transactions may be used to perform further training of the predictive model. Consequently, the predictive model may thereby adapt itself to changing badge parameter patterns (e.g., a particular badge icon might become harder to achieve as time progresses).

Either the historical transaction data 804 or the current transaction data 806 might include, according to some embodiments, determinate and indeterminate data. As used herein and in the appended claims, "determinate data" refers to verifiable facts such as a customer name of an individual or of a business or other entity; a type of customer interaction; a time of day; a day of the week; a geographic location; etc.

As used herein, "indeterminate data" refers to data or other information that is not in a predetermined format and/or location in a data record or data form. Examples of indeterminate data include narrative speech or text during a customer telephone interaction, information in descriptive notes fields and signal characteristics in audible voice data files. Indeterminate data extracted from social media posts might be associated with, for example, an amount of customer satisfaction.

The determinate data may come from one or more determinate data sources 808 that are included in the computer system 800 and are coupled to the data storage module 802. The determinate data may include "hard" data and one possible source of the determinate data may be the insurance company's databases (not separately indicated). Another possible source of determinate data may be from data entry by the insurance company's administrative personnel.

The indeterminate data may originate from one or more indeterminate data sources 810, and may be extracted from raw files or the like by one or more indeterminate data capture modules 812. Both the indeterminate data source(s) 810 and the indeterminate data capture module(s) 812 may be included in the computer system 800 and coupled directly or indirectly to the data storage module 802. Examples of the indeterminate data source(s) 810 may include data storage facilities for document images, for text files (e.g., email interactions) and digitized recorded voice files (e.g., telephone calls). Examples of the indeterminate data capture module(s) 812 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, customer opinions may be extracted from their email messages.

The computer system 800 also may include a computer processor 814. The computer processor 814 may include one or more conventional microprocessors and may operate to execute programmed instructions to provide functionality as described herein. Among other functions, the computer processor 814 may store and retrieve historical transaction data 804 and current transaction data 806 in and from the data storage module 802. Thus the computer processor 814 may be coupled to the data storage module 802.

The computer system 800 may further include a program memory 816 that is coupled to the computer processor 814. The program memory 816 may include one or more fixed storage devices, such as one or more hard disk drives, and one or more volatile storage devices, such as RAM devices. The program memory 816 may be at least partially integrated with the data storage module 802. The program memory 816 may store one or more application programs, an operating system, device drivers, etc., all of which may contain program instruction steps for execution by the computer processor 814.

The computer system 800 further includes a predictive model component 818. In certain practical embodiments of the computer system 800, the predictive model component 818 may effectively be implemented via the computer processor 814, one or more application programs stored in the program memory 816, and data stored as a result of training operations based on the historical transaction data 804 (and possibly also data received from a third party service). In some embodiments, data arising from model training may be stored in the data storage module 802, or in a separate data store (not separately shown). A function of the predictive model component 818 may be to determine appropriate badge program administration processes. The predictive model component may be directly or indirectly coupled to the data storage module 802.

The predictive model component 818 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 800 includes a model training component 820. The model training component 820 may be coupled to the computer processor 814 (directly or indirectly) and may have the function of training the predictive model component 818 based on the historical transaction data 804 and/or badge program information. (As will be understood from previous discussion, the model training component 820 may further train the predictive model component 818 as further relevant data becomes available.) The model training component 820 may be embodied at least in part by the computer processor 814 and one or more application programs stored in the program memory 816. Thus the training of the predictive model component 818 by the model training component 820 may occur in accordance with program instructions stored in the program memory 816 and executed by the computer processor 814.

In addition, the computer system 800 may include an output device 822. The output device 822 may be coupled to the computer processor 814. A function of the output device 822 may be to provide an output that is indicative of (as determined by the trained predictive model component 818) particular badge program information. The output may be generated by the computer processor 814 in accordance with program instructions stored in the program memory 816 and executed by the computer processor 814. More specifically, the output may be generated by the computer processor 814 in response to applying the data for the current transaction to the trained predictive model component 818. The output may, for example, be a true/false flag or a number within a predetermined range of numbers. In some embodiments, the output device may be implemented by a suitable program or program module executed by the computer processor 814 in response to operation of the predictive model component 818.

Still further, the computer system 800 may include badge parameters 824. The badge parameters 824 may be implemented in some embodiments by a software module executed by the computer processor 814. The badge parameters 824 may have the function of directing workflow based on the output from the output device 822. Thus, the badge parameters 824 may be coupled, at least functionally, to the output device 822. In some embodiments, for example, the badge parameters 824 may direct workflow by referring, to an employee profile portal 826 or suitable platform, current transactions analyzed by the predictive model component 818 and found to be associated with various badge decisions. In some embodiments, the employee profile portal 826 may be a part of the insurance company that operates the computer system 800.

Figure 9:
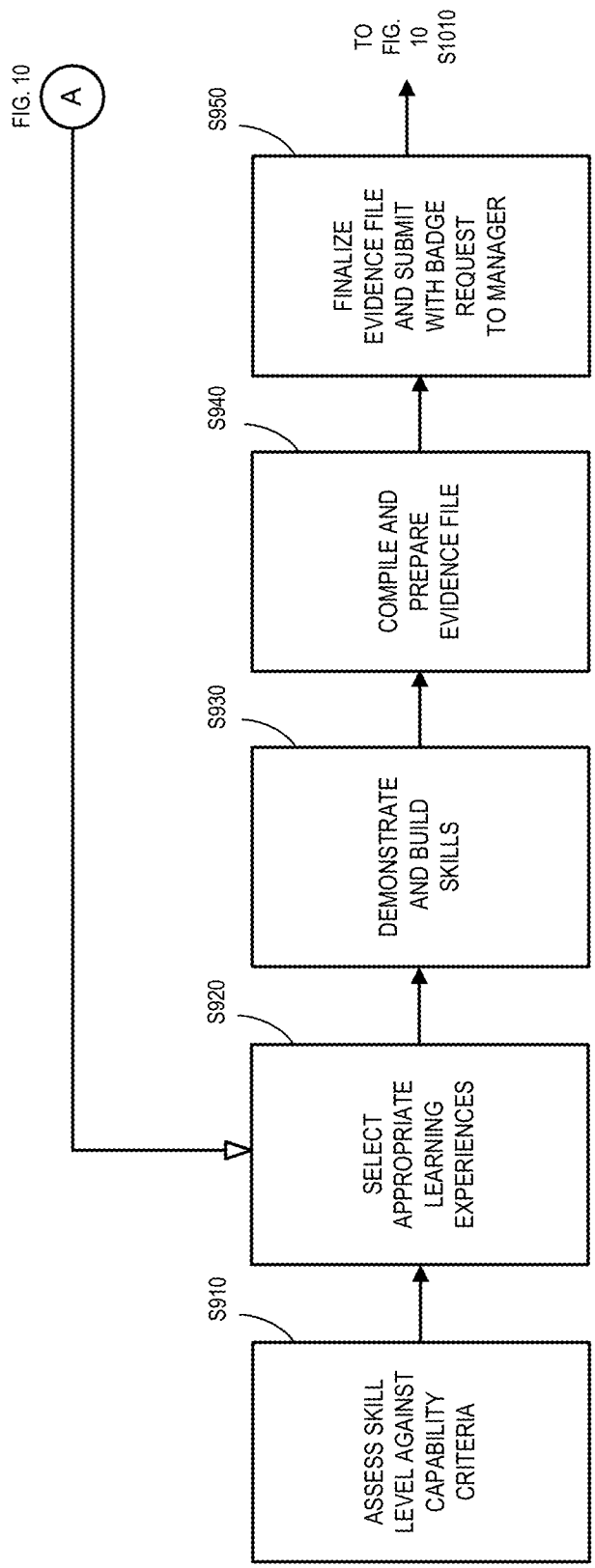
FIGS. 9 through 11 illustrate a process flow in accordance with some embodiments described herein.
Figure 10:
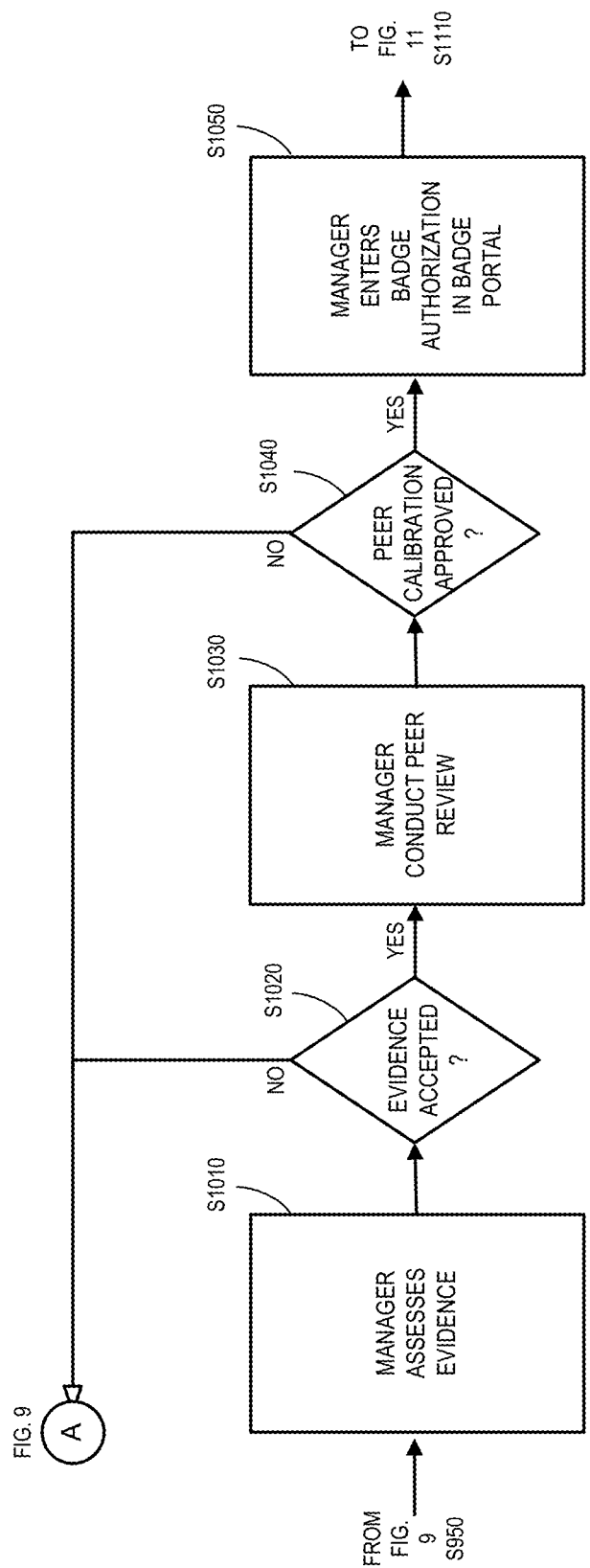
Figure 11:
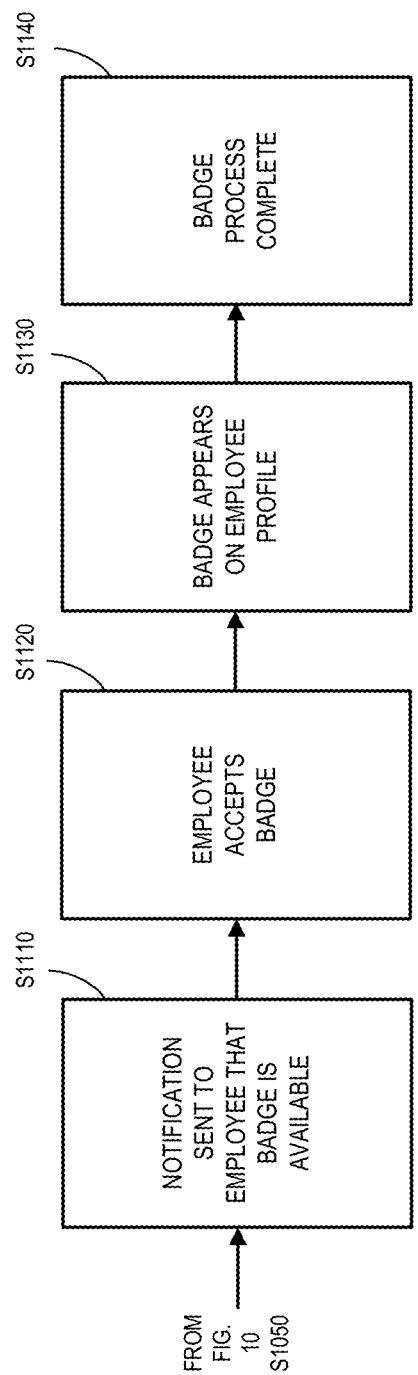

FIGS. 9 through 11 illustrate a process flow in accordance with some embodiments described herein. At S910, an employee's skill level may be assessed and compared to capability criteria. This assessment may, for example, focus on core capabilities that employees should ideally possess. At S920, one or more appropriate learning experiences may be selected for the employee. Some embodiments may use an assessment model wherein an employee partners with managers to evaluate current capabilities and determine what skill building would be helpful to improve proficiency. In some cases, an employee may work on his or her own improvements (e.g., by building and executing a development plan, maintaining an updated career path, maintaining an informative portal site, participating in a formal developmental assignment or rotation, maintain a successful relationship with a mentor, and/or networking and shadowing another job function). In other cases, an employee may interact with others to further development (e.g., by sharing knowledge with others via a presentation, by maintaining or contributing to a blog, experiencing side-by-side coaching with a peer, allowing another employee view his or her job performance, and/or mentoring another employee from a different organizational group). Still other examples may include attending particular types of meetings, participating in an employee resource group, and supporting an insurer-sponsored community event.

At S930, the employee and/or manager may demonstrate and/or build his or her skills as appropriate. At S940, an evidence file may be compiled and/or prepared by the employee and/or his or her manager. In this way, performance-based learning and assessment activities may be result in the creation of evidence that demonstrates proficiency. The evidence file may reflect, for example, whether the employee: communicates effectively with others (e.g., does the employee respond appropriately to customer during service, does employee receive customer comments that denote a clear communication process, do internal surveys indicate that the employee uses effective methods); responds with urgency to customer needs (e.g., does employee receive more than 10% service alerts on the claims he or she handles and/or does the employee's outbound call volume indicate proactive handling); collaborates on resolutions (e.g., does the employee actively identify interests, wants, and needs of the customer to resolve issues, do customers give feedback that their needs are being met, does the employee have no warranted complaints); and/or takes action to improve customer experiences (e.g., did the employee complete required or recommended learning, can the employ describe all facets of a customer loyalty program).

At S950, the evidence file may be finalized and submitted along with a badging request. In the case of an insurance claim handler, for example, the employee and/or manager might be interested in a badge associated with data and analytics. Such a badge might be associated with, for example, data input and his or her ability to understand, analyze and/or act on the data. Other examples of badges for potential employee skill categories might include: growth and development (e.g., to maximize the development of self and others); coaching (e.g., to lead, inspire, influence, and develop others to achieve business goals and objectives); communication (e.g., to use tools and communication methods, written and verbal, to effectively inform and influence others); customer focus (e.g., to continuously drive improved customer service interactions); and innovation and problem solving (e.g., to identify opportunities and develop solutions for improved efficiency, effectiveness, an/or engagement).

At S1010, the manager may assess the evidence file. At S1020, the manager may determine whether the evidence file meets a pre-determined criteria. If not, the process may revert back to S920 of FIG. 9. If the evidence file does meet the pre-determined criteria at S1020, the manager may conduct peer calibration at S1030. If the peer calibration does not approve the badging request at S1040, the process may revert back to S920 of FIG. 9. If the peer calibration does approve the badging request, the manager may enter a badge authorization via a badge portal at S1050. According to some embodiments, peer calibration may involve managers meeting with each other to determine whether proficiency has been adequately demonstrated. Such an approach may facilitate operational consistency and organizational flexibility.

At S1110, a notification may be sent to the employee indicating that his or her badge is now available. At S1120, the employee may accept the badge and the badge will then appear on the employee's profile at S1130. As a result, the process may publicly recognize employees for demonstrating a capability. At S1140, the badging process is complete.

Figure 12:
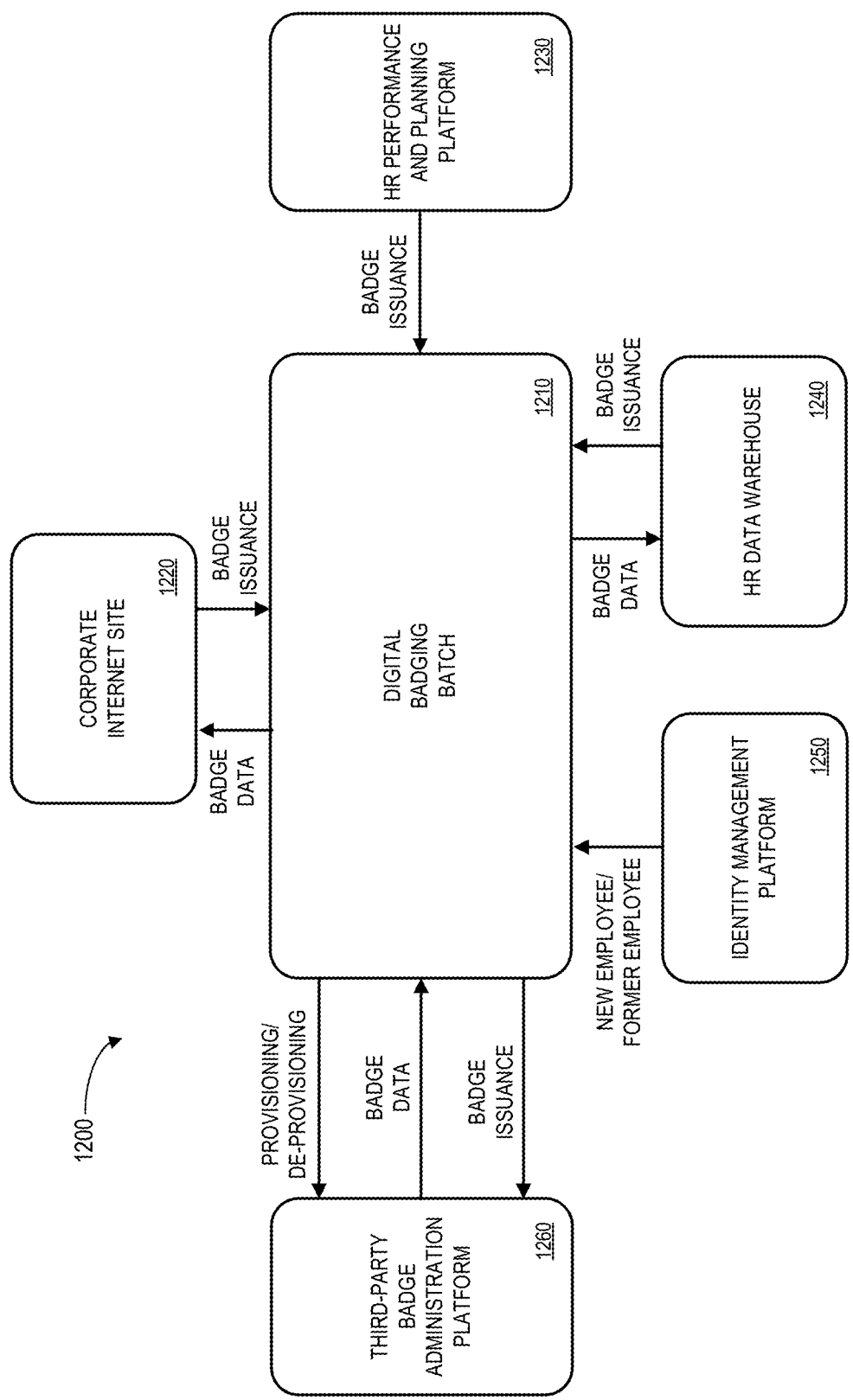
FIG. 12 illustrates a system architecture in accordance with some embodiments described herein.

FIG. 12 illustrates a system architecture 1200 in accordance with some embodiments described herein. The system architecture 1200 includes a digital badging batch 1210 that may exchange information with a corporate intranet or internet site 1220, such as one administered with SHARE-POINT® software available from MICROSOFT® to provide information to employees, provide search functionality, etc. The digital badging batch 1210 and corporate internet site 1220 might exchange, for example, badge issuance notification, badge data, and/or other information. The digital badging batch 1210 may also exchange information, such as badge issuance notifications, with an HR performance and planning platform 1230 (e.g., a platform adapted to administer HR functions, such as employee training, etc.) and/or an employee data warehouse 1240 (e.g., such as by exchanging badge issuance notifications, badge data, etc.).

The digital badging batch 1210 may further exchange information with an identity management platform 1250. The identity management platform 1250 may, for example, be associated with an active directory database of unique identifiers that can be used to add and validate new employees and/or remove former employees from the badging process. For example, information in the identify management platform 1250 may be used to verify that an appropriate employee is receiving or losing a badge in connection with a third-party badge administration platform 1260. For example, a unique license may be matched to an employee during a provisioning or de-provisioning process while the third-party badge administration platform 1260 exchanges badge issuance notifications, badge data, etc. with the digital badging batch 1210.

Thus, embodiments may provide an automated and efficient way to administer an employee skill certification badge program. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with badge information might be implemented as dashboard displays and/or the databases described herein may be combined or stored in external systems).

Figure 13:
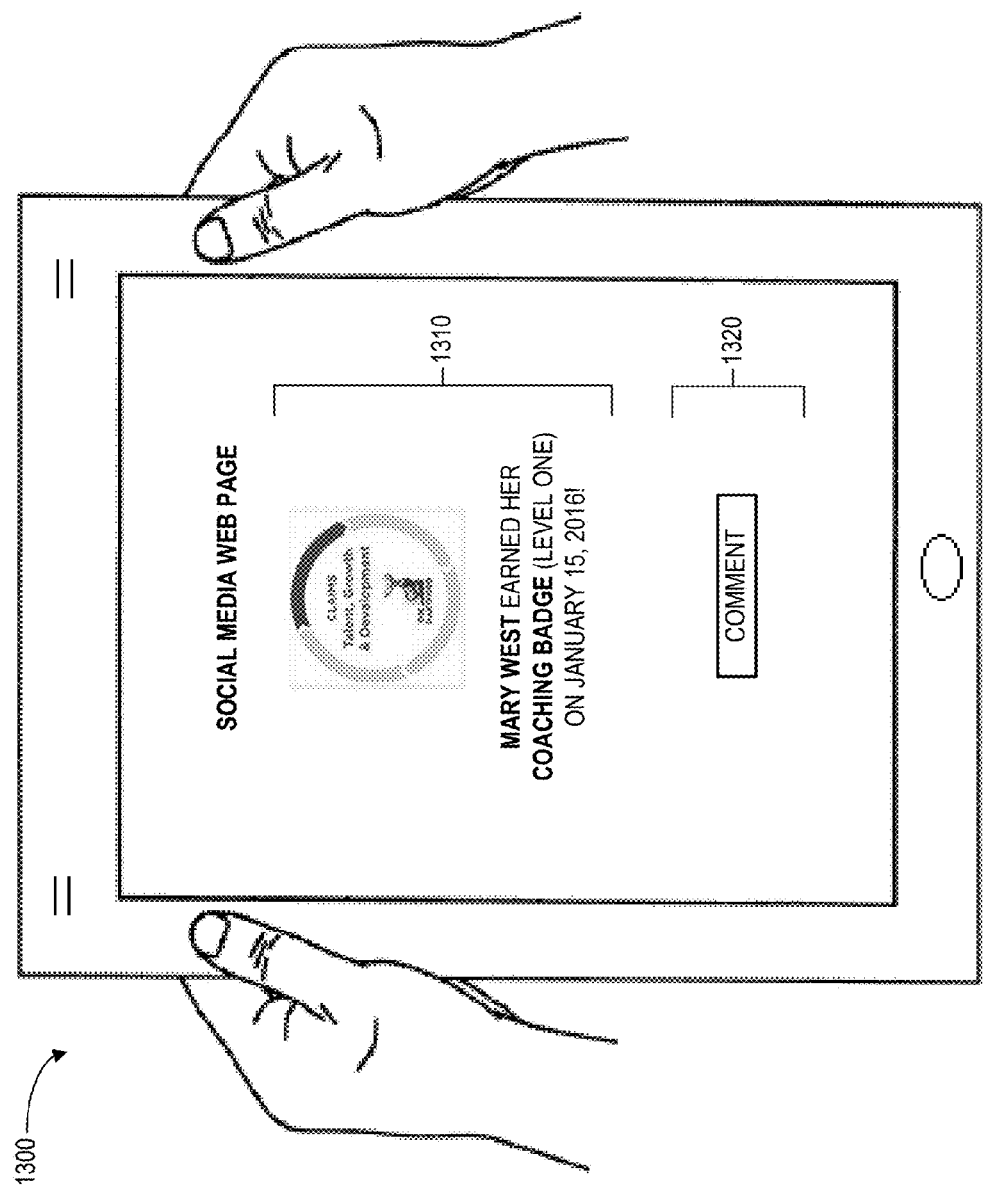
FIG. 13 illustrates a handheld social media display according to some embodiments.

Moreover, the displays 300, 400, 500 illustrated with respect to FIGS. 3 through 5 are only provided as examples, and embodiments may be associated with any other types of user interfaces. For example, FIG. 13 illustrates a handheld social media display 1300 according to some embodiments. In this particular user display 1300, badge information 1310 may be shown to users who may, in turn, provide comments and other feedback 1320 (e.g., via a touchscreen interface).

Note that the present invention provides significant technical improvements to facilitate administration of an employee skill certification badge program. The present invention is directed to more than merely a computer implementation of a routine or conventional activity previously known in the industry as it significantly advances the technical efficiency, access and/or accuracy of an employee skill certification badge program by implementing a specific new method and system as defined herein. The present invention is a specific advancement in the areas of employee motivation and satisfaction by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, human resources and/or customer networks and subsystems. For example, in the present invention badge requests may be analyzed accurately and automatically facilitated.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system for a dynamic, electronic certification platform associated with an insurance enterprise having a plurality of employees, the system comprising:
    a communication device to receive, from a remote device, an employee skill certification badge request associated with: (i) a first employee, and (ii) a first employee skill category of a plurality of potential employee skill categories; and
    a processor in communication with the communication device, wherein the processor is configured to:
        store information associated with the received employee skill certification badge request,
        gather and store data in an electronic evidence file associated with the first employee's interactions with customers during normal performance of his or her employment,
        automatically determine a first manager associated with the first employee,
        receive from the first manager an indication that an electronic evidence file meets a threshold criteria of the first employee skill category,
        responsive to the received indication, associate the first employee with the first employee skill certification badge, and
        transmit data to cause display of an icon associated with the first employee skill certification badge on other remote devices.

2. The system of claim 1, wherein the processor is further configured to:
    before associating the first employee with the first employee skill certification badge, determine that a peer calibration process approves the employee skill certification badge request.

3. The system of claim 1, wherein the icon is displayed on an employee profile web page of the first employee.

4. The system of claim 3, wherein a plurality of icons may be displayed on the employee profile web page, each icon being associated with a different employee skill category.

5. The system of claim 3, wherein the icon is associated with one of a plurality of potential skill levels for the first employee skill category.

6. The system of claim 3, wherein a pop up window displaying information about the first employee skill category may be activated by a viewer of the web page.

7. The system of claim 1, wherein the first employee is associated with insurance claims processing and the potential employee skill categories include at least one of: (i) data and analytics, (ii) growth and development, (iii) coaching, (iv) communication, (v) customer focus, and (vi) innovation and problem solving.

8. The system of claim 1, wherein the first employee's interactions with customers being evaluated comprises interactions with at least one of: (i) customers of the insurance enterprise, and (ii) other employees of the insurance enterprise.

9. The system of claim 1, wherein the processor is further configured to:

automatically facilitate a creation of a team of employees based at least in part on employee skill certification badges.

10. The system of claim 1, wherein the processor is further configured to:
automatically facilitate a comparison between offices of the insurance enterprise based on least in part on employee skill certification badges.

11. The system of claim 1, wherein the processor is further configured to:
automatically transmit information about the employee skill certification badge to: (i) an email server, (ii) a workflow application, (iii) a report generator, (iv) a social media server, and (v) a calendar application.

12. The system of claim 1, wherein the employee skill certification badge is associated with an expiration date.

13. A computerized method for a dynamic, electronic certification platform associated with an employer having a number of employees, the method comprising:
receiving, from a remote device via a communication device, an employee skill certification badge request associated with: (i) a first employee, and (ii) a first employee skill category of a plurality of potential employee skill categories;
storing, by a computer processor of a badge server, information associated with the received employee skill certification badge request;
gathering and storing, by the computer processor of the badge server, quantitative and qualitative performance data in an electronic evidence file associated with the first employee's interactions with customers during normal performance of his or her employment;
automatically determining, by the computer processor of the badge server, a first manager associated with the first employee;
receiving from the first manager an indication that the electronic evidence file meets a threshold criteria of the first employee skill category;
responsive to the received indication, associating, by the computer processor of the badge server, the first employee with the first employee skill certification badge; and
arranging, by the computer processor of the badge server, for an icon associated with the first employee skill certification badge to be displayed via other remote devices.

14. The method of claim 13, further comprising:
before associating the first employee with the first employee skill certification badge, determining that a peer calibration process approves the employee skill certification badge request.

15. The method of claim 14, wherein the icon is displayed on an employee profile web page of the first employee, and further wherein a plurality of icons may be displayed on the employee profile web page, each icon being associated with a different employee skill category.

16. The method of claim 15, wherein the icon is associated with one of a plurality of potential skill levels for the first employee skill category.

17. The method of claim 15, wherein a pop up window displaying information about the first employee skill category may be activated by a viewer of the web page.

18. The method of claim 13, wherein the first employee is associated with insurance claims processing and the potential employee skill categories include at least one of: (i) data and analytics, (ii) growth and development, (iii) coaching, (iv) communication, (v) customer focus, and (vi) innovation and problem solving.

19. The method of claim 13, further comprising:
automatically transmitting information about the employee skill certification badge to: (i) an email server, (ii) a workflow application, (iii) a report generator, (iv) a social media server, and (v) a calendar application.

20. A system for a dynamic, electronic certification platform associated with an insurance enterprise, the system comprising:
a communication device to receive, from a remote device, an insurance claim handler skill certification badge request associated with: (i) a first insurance claim handler, and (ii) a first insurance claim handling skill category of a plurality of potential insurance claim handling skill categories; and
a processor in communication with the communication device, wherein the processor is configured to:
store information associated with the received insurance claim handler skill certification badge request,
gather and store data in an electronic evidence file associated with the first insurance claim handler's interactions with insurance customers during normal performance of his or her employment,
automatically determine a first manager associated with the first insurance claim handler,
receive from the first manager an indication that the electronic evidence file meets a threshold criteria of the first insurance claim handling skill category,
responsive to the received indication, associate the first insurance claim handler with the first insurance claim handling skill certification badge, and
transmit data to cause display of an icon associated with the first insurance claim handler skill certification badge on other remote devices.

21. The system of claim 20, wherein the processor is further configured to:
before associating the first insurance claim handler with the first insurance claim handler skill certification badge, determine that a peer calibration process approves the insurance claim handler skill certification badge request.

22. The system of claim 20, wherein the icon is displayed on an insurance claim handler profile web page of the first employee, and further wherein a plurality of icons may be displayed on the insurance claim handler profile web page, each icon being associated with a different insurance claim handling skill category.

23. The system of claim 20, wherein the potential insurance claim handling skill categories include at least one of: (i) data and analytics, (ii) growth and development, (iii) coaching, (iv) communication, (v) customer focus, and (vi) innovation and problem solving.

* * * * *